May 8, 1956 L. V. FOSTER 2,744,542
MIXING FAUCET FOR SHOWERS AND THE LIKE
Filed March 27, 1952 2 Sheets-Sheet 1
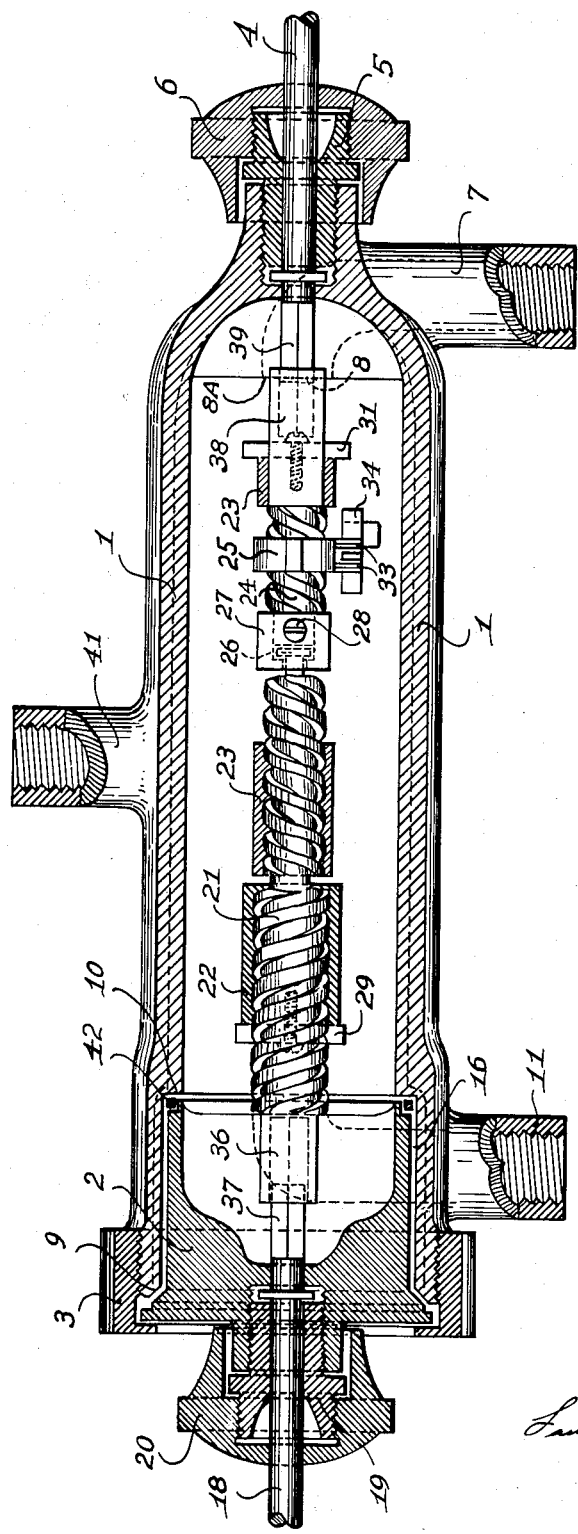
*Fig_1_*
INVENTOR.
Laurence V Foster May 8, 1956 L. V. FOSTER 2,744,542
MIXING FAUCET FOR SHOWERS AND THE LIKE
Filed March 27, 1952 2 Sheets-Sheet 2
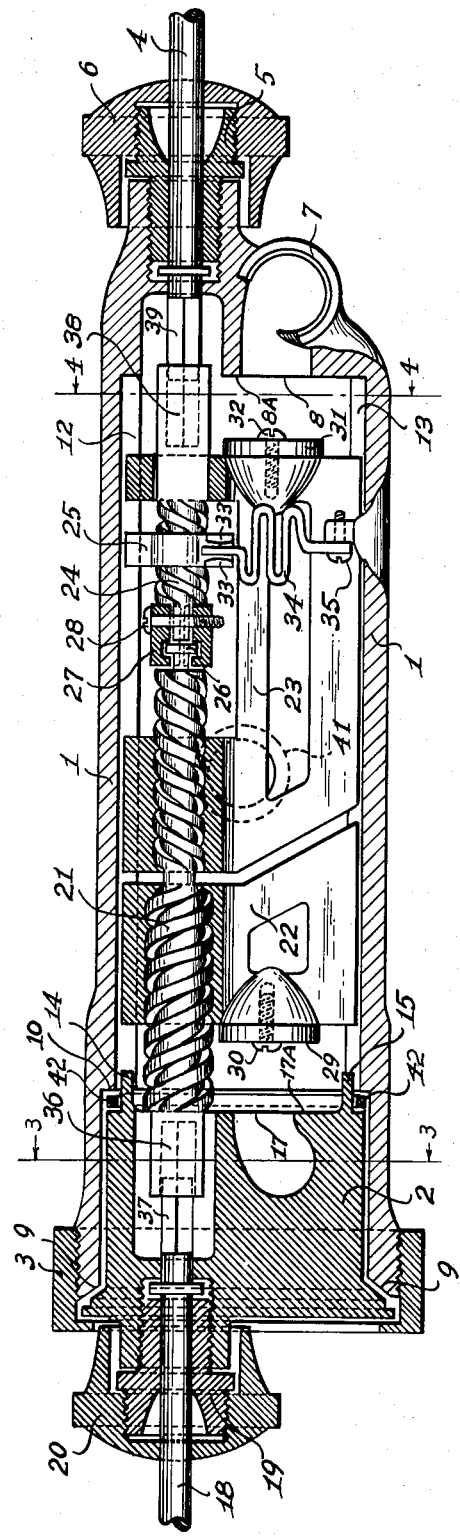
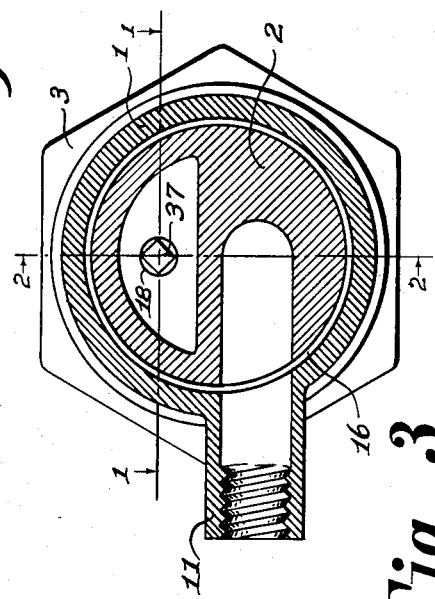
INVENTOR.

United States Patent Office 2,744,542
Patented May 8, 1956

2,744,542

MIXING FAUCET FOR SHOWERS AND THE LIKE

Lawrence V. Foster, East Liverpool, Ohio

Application March 27, 1952, Serial No. 278,843

3 Claims. (Cl. 137—630.18)

The present invention relates to a mixing faucet for showers and the like and it consists in the combinations, constructions and arrangements of parts herein described and claimed.

Generally there is provided a mixing device which is provided with a shaft extending from each end of the casing enclosing the same and the turning of one of which shafts acts to adjust the volume of the water being mixed in the casing which water is being led to the casing by a pair of pipes one of which contains cold water and the other of which contains hot water. The other shaft is designed to manipulate certain mechanisms withing the casing which control the temperature of the water being so mixed. The device contains many novel features which will be brought forth in the annexed specification.

It is accordingly an object of the invention to provide a device of the character set forth which is comparatively simple in construction, relatively inexpensive to manufacture and yet effective and efficient in use.

Another object of the invention is to provide a device of the character set forth which is provided with means for controlling the volume of the water flowing therefrom and means for regulating the temperature of the water flowing therefrom, both means forming parts of the invention.

Another object of the invention is the provision, in a device of the character set forth, of a novel valve operated mechanism forming part of the invention.

Other and further objects of the invention will become apparent from a reading of the following specification taken in conjunction with the drawings, in which:

Figure 1 is a vertical longitudinal sectional view, partly in elevation, of an embodiment of the invention, Figure 2 is a longitudinal horizontal sectional view thereof, Figure 3 is a sectional view taken along the line 3—3 of Figure 2, Figure 4 is a sectional view taken along line 4—4 of Figure 2.

Referring more particularly to the drawings, there is shown therein a casing 1 having a casting 2 mounted in one end thereof and held in position by means of a nut 3. Through the other end of the casing 1 extends a shaft 4, which is held in place by means of a retainer 5 which is threaded on to the casing 1 and which affords space for packing and is threaded to receive a packing nut 6. Adjacent that end of the casing 1 having the nut 6 thereon is a hot water inlet pipe 7 which leads to an inlet port 8 with a seat 8a within the casing 1.

Within the other end of the casing 1 there is provided a pair of annular seats 9 and 10, a rubber washer 42 which forms part of seat 10 and a cold water intake pipe 11. Within the casing 1 there is provided a pair of longitudinally extending ways 12 and 13. The casting 2 is adapted to fit seats 9 and 10 and has two projections 14 and 15 adapted to project into the ways 12 and 13, respectively. These projections are for the purpose of holding the casting 2 in its correct position with relation to the casing 1. Maintaining this position is desirable because cold water enters through the intake pipe 11 which is in the casing 1 and merges from the pipe 11 between the seats 9 and 10 and then enters an opening 16 in the casting 2 and passes through the casting 2 until it emerges from the cold water port 17 and seat 17a.

A shaft 18 extends through the casting 2 and is held in place by a retainer 19 which is threaded to the casting 2 and which affords space for packing and is threaded to receive a packing nut 20.

Within the casing 1 there is provided a screw shaft 21 on which is threaded washer mounts 22 and 23. There is also provided a screw shaft 24 on which is threaded an adjusting nut 25. The screw shaft 24 is connected to the shaft 21 by means of a yoke 27 which is held clamped over a flange 26 carried by the shaft 21 by means of screw 28. A rubber washer 29 is attached to washer mount 22 by means of a screw 30 while a rubber washer 31 is attached to washer mount 23 by means of a screw 32.

The adjusting nut 25 has two lugs 33 between which is positioned one end of a ribbon spring 34 the other end of such spring being secured to the casing 1 by means of a screw 35.

The shaft 21 has two sets of threads one of which is left-handed while the other is right-handed so that the washer mounts will moved in opposite directions when the shaft 18 is turned. The right-hand threads are larger than the left-hand threads for assembling and disassembling purposes.

At one end of the screw shaft 21 is located a square holed shoulder 36 which slides on a square shank 37 which is on the inner end of the shaft 18. At one end of the shaft 24 is a square holed shoulder 38 which is slidable upon a square shank 39 formed upon the inner end of the shaft 4.

The entire inside mechanism of the device rides on the projections upon the washer mounts 22 and 23 which ride in the ways 12 and 13. The position of the inside mechanism in relation to intake ports 8 and 17 is determined by the ribbon spring 34 only. An exhaust pipe 41 leads to a bathtub faucet (not shown).

In operation, it will be apparent that when the shaft 4 is turned clockwise to raise the temperature while to lower the temperature of the water passing through the device it is necessary to turn the shaft 4 in a counterclockwise direction.

Upon turning on the faucet, the shaft 18 turns the square shank 37 which, in turn, turns the square holed shoulder 36. This action turns the screw shaft 21 thereby causing the washer mounts 22 and 23 to move in opposite directions toward one another and away from the intake ports 8 and 17 thus allowing more water to flow in through said ports. After a desired volume is attained, temperature of the water is adjusted by turning the shaft 4 clockwise to raise the temperature and counterclockwise to lower the same. In tempering the water, shaft 4 turns the square shank 39 which actuates the square holed shoulder 38 causing the shaft 24 to turn. Screw shaft 24 is threaded through adjusting nut 25 which is held in one position in relation to the main casing by means of a strong positioning spring 34 attached to the casing by means of screw 35. The shaft 24 is attached to the screw shaft 21 by means of the yoke 27, screw 28 and flange 26 thus forming a swivel joint. Therefore, when screw shaft 24 is turned, since the nut 25 is held rigidly by spring 34, it must move through the nut 25 thus moving the shaft 21 which, in turn, causes the washer mounts 22 and 23 to slide in the ways 12 and 13 toward one intake port and away from the other thereby decreasing the flow of water from one port and increasing the flow of water from the other port, either raising or lowering the combined temperatures of the water passing through the device. The faucet may then be turned off by turning the shaft 18 clockwise until the washer mounts 22 and 23 move washers 29 and 31 against the ports 8 and 17 causing the flow of water to stop. During this operation the tempering shaft 4 is not moved. The faucet may then be turned on again by turning the shaft 18 counterclockwisely until the desired volume is attained and the spring 34 will return the temperature setting to that last used automatically and without touching the shaft 4.

By removing nut 3, casting 2 and screw 35, in that order, the entire inside mechanism may then be pulled out of casing 1 making all parts easily accessible for repairs.

While but one form of the invention has been shown and described herein, it will be readily apparent to those skilled in the art that minor modifications may be made without departing from the spirit of the invention or the scope of the appended claims.

What is claimed is:

1. A hot and cold water mixing device of the character described comprising a casing having in its inner wall two longitudinally extending ways at either end of which is located an intake port connected to hot and cold water lines respectively and an exhaust port, said intake ports having seats, two valve members which ride in said ways engaging and disengaging the seats of said intake ports, a shaft disposed longitudinally of said casing, a stem extending through one end of said casing, means including said stem for rotating said shaft for simultaneously moving said valves in opposite directions away from said intake ports toward one-another for opening or vice versa for closing both of said valves at one time thereby controlling the combined volume of flow from said intake ports, said shaft being provided with two oppositely threaded portions, said valves threaded to said threaded portions, said shaft slip jointly connected to said stem, a second shaft disposed longitudinally of said casing and swivelly connected to said first mentioned shaft, a second stem slip jointly connected to said second mentioned shaft and extending through the other end of said casing, said second mentioned shaft having a threaded portion, a collar threaded to said threaded portion of said second shaft, said collar having a projection extending into one of said ways, said ways co-operating with said valves and said collar preventing said valves and said collar from rotating with their respective actuating shafts, a positioning spring interconnecting said collar and said casing, one end of said positioning spring being rigidly attached to said casing while the other or moveable end is positioned between two lugs projecting from said collar, other means including said second stem for rotating said second shaft for simultaneously moving said valves in a common direction toward one of said intake ports and away from the other of said intake ports hence gradually increasing to full the volume of flow from one of said intake ports while decreasing to the same degree the volume of flow from the other of said intake ports or vice versa without affecting the combined volume of flow from said intake ports, said second mentioned means being operated independently of first mentioned means, when said valves are away from said seats the elastic force of said positioning spring holds said collar motionless causing said second shaft when rotated to move through said collar thereby moving said valves in unison toward one of said intake ports and away from the other of said intake ports or vice versa, when moving both of said valves against their seats by rotation of first mentioned shaft and when one or the other of said valves reaches its seat first the elastic force in said positioning spring yields to the actuating force allowing said collar to move toward the unseated valve permitting said unseated valve to seat also upon further actuation of said first means, when both of said valves are moved away from said seats by rotation of said first shaft or when the device is turned on the stored elastic force in the depressed positioning spring is released thereby automatically repositioning said valves between said intake ports in such a manner that the individual volume of flow from each individual said intake port is identical to the individual volume of flow being emitted therefrom when the device was last turned off, said automatic readjustment occurring when said valves are moved away from said seats by first mentioned means to a position between said intake ports where the combined volume of flow from said intake ports is equal to the combined volume of flow being emitted therefrom before said valves were last moved into contact with said seats to stop all flow therefrom.

2. In a hot and cold water mixing device of the character described consisting in the combination of, a casing having in its inner wall two longitudinally extending ways at either end of which is located an intake port connected to hot and cold water lines respectively and an exhaust port, a floating mechanism which rides in said ways, said floating mechanism comprised of a shaft disposed longitudinally of said casing onto which is threaded two valve members which engage and disengage said intake ports and yet a second shaft swivelly connected to the first mentioned shaft and a collar threaded to said second shaft, said first shaft having two oppositely threaded portions, said valves threaded to said threaded portions, a stem extending through one end of said casing as means for rotating said first mentioned shaft for simultaneously moving said valves in opposite directions toward the center of said floating mechanism and away from both of said intake ports hence gradually increasing from nothing to full or any portion thereof the combined volume of flow from said intake ports or vice versa for decreasing the combined volume of flow from said intake ports, a second stem extending through the other end of said casing as other means for rotating said second mentioned shaft for moving said floating mechanism in unison with said valves toward one of said intake ports and away from the other of said intake ports thereby increasing the volume of flow from one of said intake ports to full or any portion thereof while decreasing to an equal degree the volume of flow from the other of said intake ports or vice versa without affecting the combined volume of flow passing through the device, said second means operated independently of said first means, said collar having a portion projecting into one of said ways, said ways co-operating with said valves and said collar preventing said valves and said collar from rotating with their respective actuating shafts, a positioning spring interconnecting said collar and said casing, one end of said positioning spring being rigidly attached to said casing while the other or moveable end is positioned between two lugs projecting from said collar, when said valves are away from said seats the elastic force of said positioning spring holds said collar motionless causing said second shaft when rotated to move through said collar thereby moving said valves in unison toward one of said intake ports and away from the other of said intake ports or vice versa hence decreasing the volume of flow from one of said intake ports while increasing to a like degree the volume of flow from the other said intake ports, when moving both of said valves against their seats by rotation of first mentioned shaft and when one or the other of said valves reaches its seat first the elastic force in said positioning spring yields to the actuating force allowing said collar to move toward the unseated valve permitting said unseated valve to seat also thus turning the device off, when both of said valves are moved away from said seats by rotation of said first shaft or when the device is turned on the stored elastic force in the depressed positioning spring is released thereby automatically repositioning said valves between said intake ports in such a manner that the individual volume of flow from each individual said intake port is identical to the individual volume of flow being emitted therefrom when the device was last turned off, said automatic readjustment occuring when said valves are moved away from said seats by first mentioned means to a position between said intake ports where the combined volume of flow from said intake ports is equal to the combined volume of flow being emitted therefrom before said valves were last moved into contact with said seats to stop all flow therefrom.

3. In a hot and cold water mixing device of the character described consisting in the combination of, a casing having in its inner wall two longitudinally extending ways at either end of which is located an intake port connected to hot and cold water lines respectively and an exhaust port, two valve members which ride in said ways engaging and disengaging the seats of said intake ports, a shaft disposed longitudinally of said casing, said shaft being provided with two oppositely threaded portions, said valves threaded to said threaded portions, a stem slip jointly connected to the outer end of said shaft and extending through one end of said casing, a second shaft disposed longitudinally of said casing and swivelly connected to and abutting the inner end of said first shaft, a second stem slip jointly connected to the outer end of said second shaft and extending through the other end of said casing, said second shaft being provided with a threaded portion, a collar threaded to said threaded portion of said second shaft, a portion of said collar projecting into one of said ways, said ways co-operating with said valves and said collar preventing said valves and said collar from rotating with said first and second shafts respectively, a positioning spring interconnecting said collar and said casing, one end of said positioning spring being rigidly attached to said casing while the other or moveable end is positioned between two lugs projecting from said collar, means including said first mentioned stem for rotating said first mentioned shaft thereby moving said valves away from said intake ports and toward one-another simultaneously opening both of said valves to any degree or vice versa for closing said valves thus controlling the combined volume of flow from said intake ports, other means including said second stem for rotating said second mentioned shaft causing said second shaft to move through said collar which is held motionless by said positioning spring thereby moving said valves in unison away from one of said intake ports and toward the other of said intake ports hence increasing the volume of flow from one of said intake ports to full flow or any portion thereof while decreasing to a like degree the volume of flow from the other of said intake ports or vice versa without affecting the combined volume of flow from said intake ports to the exhaust port, said second means operated independently of said first means, said positioning spring functioning to hold said valves in any position selected by said second means relative to said intake ports, said positioning spring further functioning when said valves are moved toward said seats by first means and when one or the other of said valves reaches its seat first the elastic force in said positioning spring yields to the actuating force allowing said collar to move toward the unseated valve permitting said unseated valve to reach its seat also hence turning the device off, said positioning spring still further functioning when both of said valves are moved away from their seats by rotation of said first shaft or when the device is turned on the stored elastic force in the depressed positioning spring is released thereby automatically repositioning said valves between said intake ports in such a manner that the individual volume of flow from each individual said intake port is identical to the individual volume of flow being emitted therefrom when the device was last turned off, said automatic readjustment occurring when said valves are moved away from said seats by first mentioned means to a position between said intake ports where the combined volume of flow from both of said intake ports is equal to the combined volume of flow being emitted therefrom before said valves were last moved into contact with said seats to stop all flow therefrom.

References Cited in the file of this patent

UNITED STATES PATENTS

| 1,790,625 | Kent | Jan. 27, 1931 |
| 2,601,053 | Ovary | June 17, 1952 |

FOREIGN PATENTS

| 517,386 | France | Dec. 17, 1920 |